US011669282B2

(12) United States Patent
Jimbo

(10) Patent No.: US 11,669,282 B2
(45) Date of Patent: Jun. 6, 2023

(54) IMAGE FORMING APPARATUS, IMAGE FORMING METHOD, AND NON-TRANSITORY COMPUTER READABLE MEDIUM

(71) Applicant: FUJIFILM Business Innovation Corp., Tokyo (JP)

(72) Inventor: Junichiro Jimbo, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/711,426

(22) Filed: Apr. 1, 2022

(65) Prior Publication Data
US 2023/0080206 A1 Mar. 16, 2023

(30) Foreign Application Priority Data
Sep. 15, 2021 (JP) ............................ JP2021-150663

(51) Int. Cl.
*G06F 3/12* (2006.01)
(52) U.S. Cl.
CPC .......... *G06F 3/1205* (2013.01); *G06F 3/1243* (2013.01); *G06F 3/1253* (2013.01); *G06F 3/1267* (2013.01)
(58) Field of Classification Search
CPC .... G06F 3/1205; G06F 3/1243; G06F 3/1253; G06F 3/1267
See application file for complete search history.

(56) References Cited

U.S. PATENT DOCUMENTS

| 8,773,694 B2 | 7/2014 | Takagi et al. |
| 10,789,031 B2 | 9/2020 | Iida et al. |
| 10,831,418 B1* | 11/2020 | Morales ................. G06F 3/1285 |
| 2008/0231885 A1* | 9/2008 | Truong ................... G06F 3/122 358/1.15 |
| 2008/0297814 A1* | 12/2008 | Jacobs .................. G06F 3/1207 358/1.9 |
| 2009/0040549 A1 | 2/2009 | Miyamoto |
| 2009/0097047 A1* | 4/2009 | Mitsui ................... G06F 3/1208 358/1.9 |
| 2010/0046013 A1* | 2/2010 | Bonikowski ....... G03G 15/0131 358/1.9 |
| 2016/0154612 A1* | 6/2016 | Hayakawa ............ G06F 3/1206 358/1.15 |
| 2021/0397391 A1* | 12/2021 | Mu ....................... G06F 3/1247 |

FOREIGN PATENT DOCUMENTS

| JP | 2009-42977 A | 2/2009 |
| JP | 2012-94113 A | 5/2012 |
| JP | 2020-17217 A | 1/2020 |

* cited by examiner

*Primary Examiner* — John R Wallace
(74) *Attorney, Agent, or Firm* — Oliff PLC

(57) ABSTRACT

An image forming apparatus includes a processor configured to: acquire information about a rendering engine from a first image forming apparatus out of plural image forming apparatuses connected to a network that are capable of performing printing using corresponding rendering engines each including predetermined plural setting items; display a setting item that is able to be changed, out of a setting item for the rendering engine acquired from the first image forming apparatus and a setting item for a rendering engine provided in the image forming apparatus; and receive a change of the setting item.

16 Claims, 8 Drawing Sheets

FIG. 3

| SETTING ITEMS | IMAGE FORMING APPARATUS 20 | IMAGE FORMING APPARATUS 30 | |
|---|---|---|---|
| | PDF ENGINE A | PDF ENGINE A | PDF ENGINE B |
| NUMBER OF COPIES TO BE PRINTED | ○ | ○ | ○ |
| PAPER SIZE | ○ | ○ | ○ |
| COLOR MODE | ○ | ○ | ○ |
| DOUBLE-SIDED PRINT | × | × | ○ |
| IMAGE QUALITY CORRECTION FUNCTION 1 | ○ | ○ | ○ |
| IMAGE QUALITY CORRECTION FUNCTION 2 | × | × | ○ |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-150663 filed Sep. 15, 2021.

BACKGROUND

(i) Technical Field

The present disclosure relates to an image forming apparatus, an image forming method, and a non-transitory computer readable medium.

(ii) Related Art

In Japanese Unexamined Patent Application Publication No. 2020-17217, an image forming apparatus including a storing unit that provides a folder associated with printing setting information and an image forming unit that forms an image on a sheet is disclosed. The image forming apparatus includes transmitting means for transmitting screen information for displaying a screen to an external apparatus, the screen receiving specification of a print file to be transferred in association with the folder to the image forming apparatus, the screen being capable of receiving temporary setting applied with a higher priority than the printing setting information stored in advance in the folder, and executing means for causing the image forming unit to execute, in accordance with printing setting in which a setting item of the temporary setting is applied with a higher priority than the printing setting information, image formation based on the print file transferred in association with the folder.

In Japanese Unexamined Patent Application Publication No. 2012-094113, a print system including an information processing apparatus, a print server, and a printer, the information processing apparatus including a virtual printer driver generating a print job in an intermediate format not dependent on a printer, the print server managing the print job, is disclosed. The print server includes storing means for storing the print job in the intermediate format received from the information processing apparatus, setting change receiving means for receiving from the printer an instruction for changing printing setting information for the print job in the intermediate format stored in the storing means, updating means for updating the printing setting information about the print job in accordance with the instruction for changing the printing setting information, printing request receiving means for receiving a printing request from the printer, and job transmitting means for generating, in accordance with the printing request, on the basis of the print job in the intermediate format and the printing setting information updated by the updating means, a print job in a format that is able to be printed by the printer and transmitting the generated print job to the printer. The printer includes selecting means for selecting a print job, setting change transmitting means for transmitting an instruction for changing the printing setting information for the print job selected by the selecting means, printing request transmitting means for transmitting the printing request for the print job to the print server, and printing means for printing the print job transmitted by the job transmitting means.

In Japanese Unexamined Patent Application Publication No. 2009-042977, an image forming system including a data processing apparatus and an image forming apparatus that are connected via a communication line, the image forming apparatus forming, in accordance with a printing instruction transmitted from the data processing apparatus, an image on paper specified in the printing instruction, is disclosed. The image forming apparatus includes a setting unit that sets paper information containing irregular shape size information indicating paper size of irregularly shaped paper used at the image forming apparatus, a communication unit that communicates with the data processing apparatus via the communication line, and a transmission control unit that controls the communication unit and transmits the paper information to the data processing apparatus. The data processing apparatus includes a communication unit that communicates with the image forming apparatus via the communication line, a registration unit that registers the paper information received from the image forming apparatus via the communication unit, and a printer driver unit that allows a user to specify the irregularly shaped paper on the basis of the paper information registered in the registration unit and generates a print instruction containing information about the irregularly shaped paper in the case where the irregularly s aped paper is specified by the user.

SUMMARY

An image forming system capable of causing a desired image forming apparatus, out of a plurality of image forming apparatuses connected to a network, to perform printing is suggested. A user is able to perform printing using a rendering engine provided in, for example, an image forming apparatus that is most frequently used among a plurality of image forming apparatuses. Even in this case, the user is able to perform printing using another image firming apparatus different from the image forming apparatus. In the case where printing is performed using the different image forming apparatus, the different image forming apparatus may include a rendering engine different from the rendering engine provided in the most frequently used image forming apparatus, and a printing setting of the rendering engine provided in the different image forming apparatus might not be able to be used.

Aspects or non-limiting embodiments or the present disclosure relate to providing an image forming apparatus, an image forming method, and a non-transitory computer readable medium that are capable of changing a printing setting of a rendering engine when performing printing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: acquire information about a rendering engine from a first image forming apparatus out of plural image forming apparatuses connected to a network that are capable of performing printing using corresponding rendering engines each including predetermined plural setting items; display a setting item that is able to be changed, out of a setting item for the rendering engine acquired from the first image forming apparatus and a setting item for a rendering engine provided in the image forming apparatus; and receive a change of the setting item.

BRIEF DESCRIPTION OF THE DRAWINGS

Exemplary embodiments of the present disclosure will be described in detail based on the following figures, wherein:

FIG. 3 is an explanatory diagram for explaining PDF engines provided in image forming apparatuses according to an exemplary embodiment of the present disclosure;

DETAILED DESCRIPTION

Exemplary Embodiments

Figure 1:
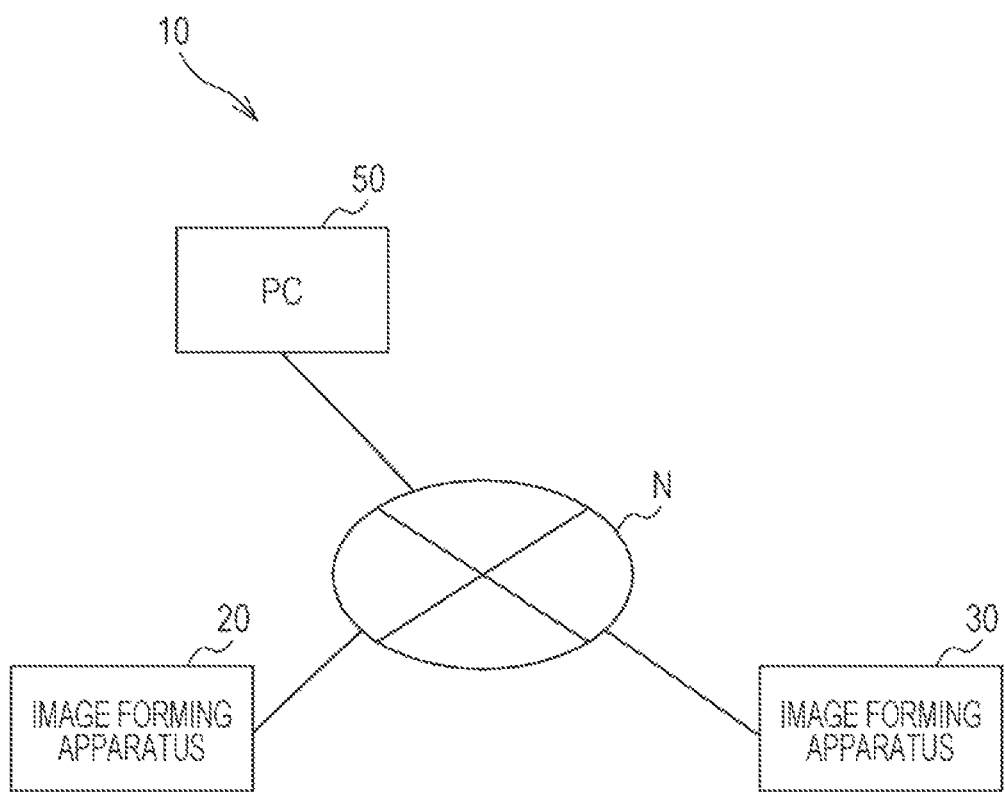
FIG. 1 is a schematic configuration diagram of an image forming system according to an exemplary embodiment of the present disclosure.

Hereinafter, exemplary embodiments of the present disclosure will be described with reference to the drawings. Throughout the drawings, the same or equivalent components and parts are denoted by the same reference signs. The dimensional ratios in the drawings are exaggerated for convenience of explanation and may be different from the actual ratios.

An example of an image forming system 10 according to an exemplary embodiment will be described with reference to FIG. 1.

FIG. 1 is a diagram illustrating an example of a schematic configuration of the image forming system 10 according to this exemplary embodiment.

As illustrated in FIG. 1, in the image forming system 10 according to this exemplary embodiment, image forming apparatuses 20 and 30 are connected via a network N. The network N may be, for example, a local area network (LAN), a wide area network (WAN), or the Internet. Furthermore, a personal computer (PC) 50 is connected to the image forming system 10 via the network N. Although a single PC 50 is illustrated in FIG. 1, a plurality of PCs 50 may be connected to the network N.

The image forming apparatuses 20 and 30 each have various functions such as a print function, a copy function, a facsimile (FAX) function, and a scanner function.

In this exemplary embodiment, the image forming apparatuses 20 and 30 are in a predetermined relationship. More specifically, the specific relationship is such that one of the image forming apparatuses 20 and 30, for example, the image forming apparatus 20 in this exemplary embodiment, is set as a parent apparatus and the other image forming apparatus, which is the image forming apparatus 30 in this exemplary embodiment, is set as a child apparatus. The parent apparatus is, for example, an image forming apparatus that stores a print job when a print function is used. Print jobs are not necessarily stored in a parent apparatus. Print jobs may be stored in a child apparatus or any image forming apparatus. Furthermore, an image forming apparatus common to all users may be set as a parent apparatus or different image forming apparatuses may be set as parent apparatuses for individual users.

Explanation will be provided below based on the assumption that one of the image forming apparatuses 20 and 30, for example, the image forming apparatus 20 in this exemplary embodiment, is an example of a first image forming apparatus and is used by a user as a main image forming apparatus. The image forming apparatus 20, which is used by the user as the main image forming apparatus, is selected by the user from among the image forming apparatuses 20 and 30 because, for example, the image forming apparatus 20 is located near the user.

Next, a hardware configuration of the image forming apparatuses 20 and 30 will be described. The image forming apparatus 20 and the image forming apparatus 30 have common hardware configurations. Thus, the common hardware configurations will be described taking the image forming apparatus 20, which is an example the first image forming apparatus, as an example.

Figure 2:
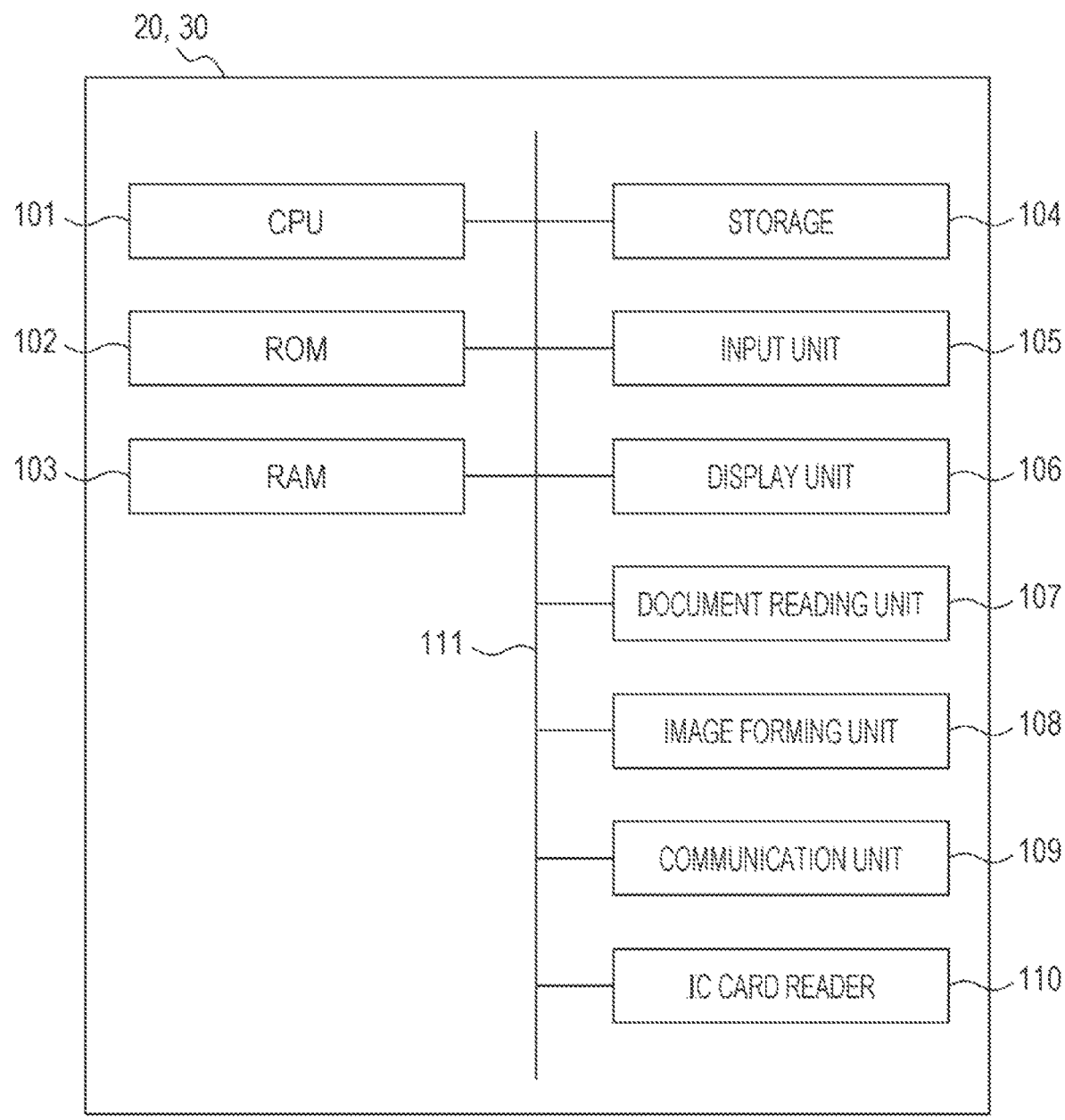
FIG. 2 is a schematic block diagram of an image forming apparatus according to an exemplary embodiment of the present disclosure.

FIG. 2 is a block diagram illustrating a hardware configuration of the image forming apparatus 20 according to an exemplary embodiment.

As illustrated in FIG. 2, the image forming apparatus 20 includes a central processing unit (CPU) 101, which is an example of a processor, a read only memory (ROM) 102, a random access memory (RAM) 103, a storage 104, an input unit 105, a display unit 106, a document reading unit 107, a image forming unit 108, a communication unit 109, and an IC card reader 110. The components mentioned above are connected so that they are able to communicate with one another via a bus 111.

The CPU 101 executes various programs and controls various units. That is, the CPU 101 reads a program from the ROM 102 or the storage 104 and executes the program using the RAM 103 as a work area. The CPU 101 controls the components mentioned above and performs various arithmetic operations in accordance with the program stored in the ROM 102 or the storage 104. In this exemplary embodiment, the program is stored in the ROM 102 or the storage 104.

The ROM 102 stores various programs and various data. The RAM 103 serves as a work area and temporarily stores a program or data. The storage 104 includes a hard disk drive (HDD) or a solid state drive (SSD). The storage 104 stores various programs including an operating system and various data.

Furthermore, a portable document format (PDF) engine, which is a rendering engine dealing with PDFs is stored in the storage 104. The PDF engine (also referred to as a "PDF print engine") is an example of a rendering engine. An example of the rendering engine is not limited to a PDF engine and may be a rendering engine of other file formats. Setting items 200 used for printing PDFs are able to be set by the PDF engine. The setting items 200 for the PDF engine include, as illustrated in FIG. 3, "number of copies to be printed", "paper size", "color mode", "double-sided print", "sort", "print mode", "layout", "password", "image quality correction function 1", "image quality correction function 2", and the like. "Number of copies to be printed" is an item for setting the number of copies to be printed, such as "1 copy" or "2 copies". "Paper size" is an item for setting the size of paper on which printing is to be performed, such as "auto" or "A4". "Color mode" is an item for setting color to be printed, such as "auto", "monochrome", or "color". "Double-sided print" is an item for setting double-sided printing, such as "N/A", "long edge", or "short edge". "Image quality correction function 1" is an item for setting image quality correction 1, such as "yes" or "no". "Image quality correction function 2" is an item for setting image quality correction 2, which is different from the image quality correction 1, such as "yes" or "no". The setting items 200 that are able to be set by the PDF engine are not limited to the items illustrated in FIG. 3 and do not necessarily include all the items illustrated in FIG. 3.

Furthermore, in this exemplary embodiment, as illustrated in FIG. 3, the case where the image forming apparatus 20 serving as a parent apparatus includes a PDF engine A and the image forming apparatus 30 serving as a child apparatus includes the PDF engine A and a PDF engine B will be described. The PDF engine A is capable of setting the setting items 200 "number of copies to be printed", "paper size", "color mode", and "image quality correction function 1". The PDF engine B is capable of setting the setting items 200 "number of copies to be printed", "paper size", "color mode", "double-sided print", "image quality correction function 1", and "image quality correction function 2". Furthermore, circle marks in FIG. 3 represent that corresponding setting items 200 are able to be set. Cross marks in FIG. 3 represent that corresponding setting items 200 are not able to be set.

Although it is desirable that the image forming apparatuses 20 and 30 each include a plurality of PDF engines, the image forming apparatuses 20 and 30 do not necessarily include a plurality of PDF engines. The image forming apparatus 20 serving as a parent apparatus may include a plurality of PDF engines and the image forming apparatus 30 serving as a child apparatus may include a PDF engine. Furthermore, three or more PDF engines may be provided.

The input unit 105 includes a pointing device such as a mouse and a keyboard and is used to perform various input operations. As described later, the input unit 105 is used to, for example, set the setting items 200 for a PDF engine and execute a function such as instruction for starting printing. Furthermore, in this exemplary embodiment, the display unit 106 of a touch panel type functions as the input unit 105.

The display unit 106 is, for example, a liquid crystal display. The display unit 106 displays various types of information under the control of the CPU 101. The display unit 106 is of a touch panel type and also functions as the input unit 105.

The document reading unit 107 picks up documents, one sheet by one sheet, placed on a paper feed table of an automatic feeder, which is not illustrated in FIG. 2, provided in an upper part of the image forming apparatus 20, and optically reads the documents to obtain image information. Alternatively, the document reading unit 107 optically reads documents placed on a table such as a platen glass to obtain image information.

Image information of a document read by the document reading unit 107 is stored into the storage 104 of the image forming apparatus 20, printed by the image forming unit 108, which will be described later, or transmitted to other image forming apparatuses having a FAX function by the communication unit 109, which will be described later.

The image forming unit 108 forms an image based on print data contained in a print job obtained from the PC 50 connected via the network N or image information obtained by reading by the document reading unit 107, that is, prints the image, on a recording medium such as paper.

The communication unit 109 is connected to the network N so that the image forming apparatus 20 is able to communicate with other apparatuses such as the image forming apparatus 30 and the PC 50.

Furthermore, the communication unit 109 allows the image forming apparatus 20 to connect to a public line so that the image forming apparatus 20 is able to transmit and receive image information obtained by reading by the document reading unit 107 to and from other image forming apparatuses having the FAX function.

The IC card reader 110 reads information stored in an integrated circuit (IC) card, such as a user ID. After the IC card reader 110 reads information stored in an IC card to identify a user, functions of the image forming apparatus 20 are enabled.

An IC card that stores a user ID or the like as authentication information for authenticating a user needs to be distributed in advance to the user of the image forming apparatus 20.

Furthermore, identification of a user is not necessarily performed by reading of an IC card using the IC card reader 110. A user may input the ID of the user using the input unit 105 so that the user is able to be identified. Alternatively, authentication information may be registered in advance in the image forming apparatus 20, and the list of registered authentication information may be acquired and displayed on the display unit 106. In this case, the user may select authentication information corresponding to the user from the list of authentication information displayed on the display unit 106, so that the user is able to be identified.

Next, an operation of the image forming system 10 will be described.

Figure 4:
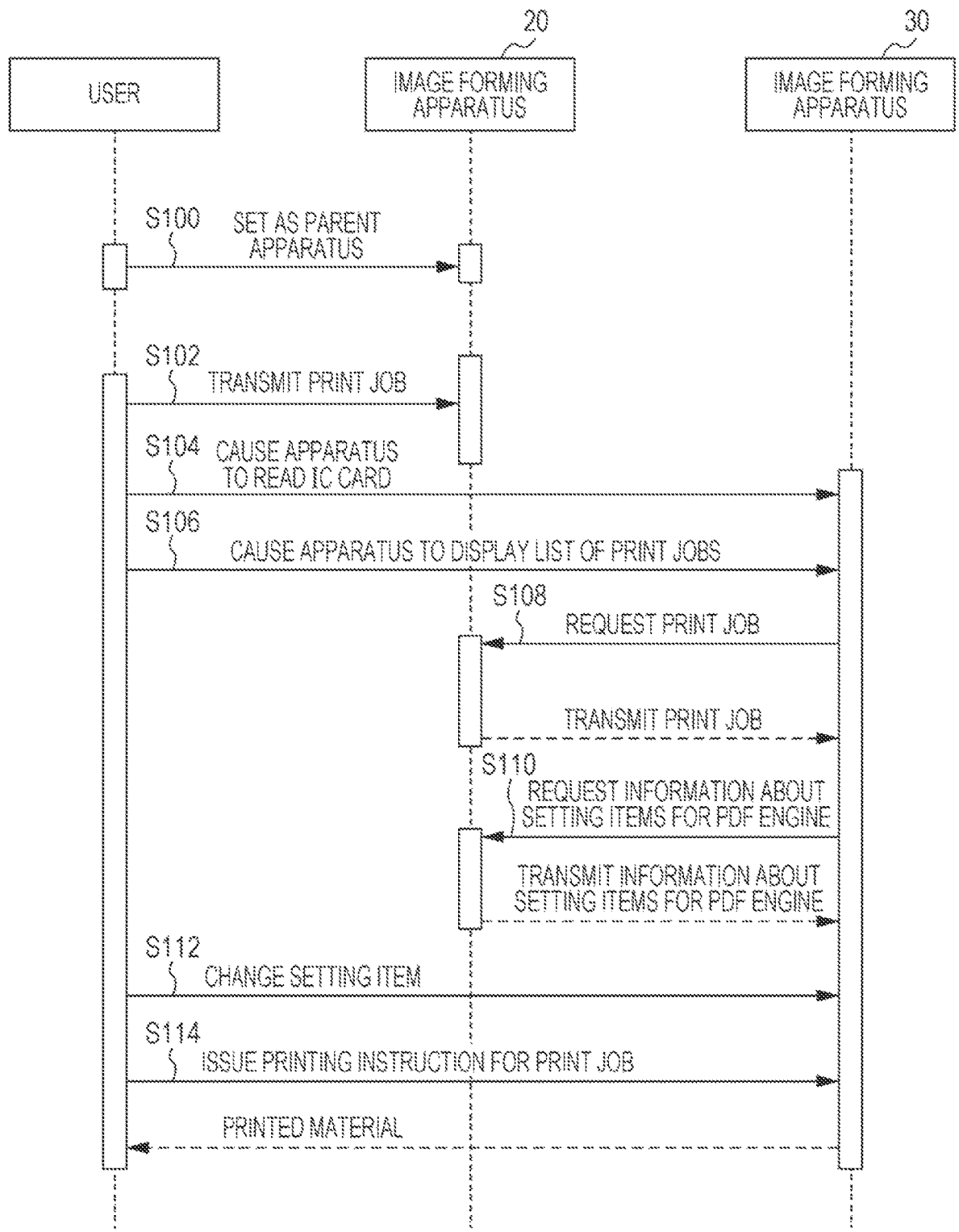
FIG. 4 is sequence diagram illustrating an example of an operation of an image forming system according to an exemplary embodiment of the present disclosure.

FIG. 4 is a schematic sequence diagram illustrating an example of an operation of the image forming system 10 for printing a PDF file (data in PDF format).

In step S100 in FIG. 4, a user accesses, using the PC 50 connected to the network N, the image forming apparatus 20 to be set as a parent apparatus. Then, the user sets the image forming apparatus 20 as a parent apparatus. The CPU 101 of the image forming apparatus 20, which has received setting as a parent apparatus, stores setting information as the parent apparatus.

Setting as a parent apparatus is not necessarily performed using the PC 50 connected to the network N. Setting as a parent apparatus may be performed using the input unit 105 of the image forming apparatus 20 as a parent apparatus or the input unit 105 of the image forming apparatus 30 as a child apparatus. Furthermore, although the image forming apparatus 20 is not set as a child apparatus but an image forming apparatus 30 different from the parent apparatus is set as a child apparatus in this exemplary embodiment, the present disclosure is not limited to this. The user may access the image forming apparatus 30 to be set as a child apparatus and set the image forming apparatus 30 as a child apparatus.

In step S102, the user transmits, as a print job, a PDF file to be printed from the PC 50 connected to the network N. In this exemplary embodiment, for transmission of a print job, a PDF file is transmitted, using a PDF direct print function, to the image forming apparatus 20 as a parent apparatus. The PDF direct print function is a function for transmitting, using an lpr command or a dedicated application, without, using a printer driver, the PDF file to the image forming apparatus 20 and printing the PDF file. In the case where the print job is transmitted using an lpr command, the setting item 200 "double-sided print" and the like are set by the user using the input unit 105 of the image forming apparatus 20 when printing is performed by the image forming unit 108. Furthermore, in the case where the print job is transmitted using a dedicated application, the setting item 200 "double-sided print" and the like are set on the dedicated application, and then the setting items 200 may be changed using the input unit 105 of the image forming apparatus 30 when printing is performed by the image forming unit 108.

In this exemplary embodiment, the print job is transmitted to the image forming apparatus 20 as the parent apparatus, as described above. The image forming apparatus 20 receives the print job, and stores the print job. The print job contains authentication information for authenticating the user who uses the PC 50 as well as print data, so that the CPUs 101 of the image forming apparatuses 20 and 30 are able to identity the user who has transmitted the print job.

In step S104, the user causes the IC card reader 110 of the image forming apparatus 30 to read an IC card. The image forming apparatus 30 that is caused to read the IC card by the user is an image forming apparatus to which the user has moved so that printing of the print job is able to be performed. The image forming apparatus 30 reads the IC card, and the CPU 101 of the image forming apparatus 30 performs login processing.

In step S106, the user causes the input unit 105 of the image forming apparatus 30 to perform an operation for displaying the list of print jobs.

In step S108, the CPU 101 of the image forming apparatus 30 requests the image forming apparatus 20 for a print job for authentication information corresponding to the authentication information registered in the read IC card. Then, the CPU 101 of the image forming apparatus 20 transmits the print job. The image forming apparatus 30 receives the print job, and the CPU 101 of the image forming apparatus 30 displays the list of the print jobs on the display unit 106.

In step S110, the CPU 101 of the image forming apparatus 30 requests the image forming apparatus 20 as the parent apparatus for information about the setting items 200 for a PDF engine provided in the image forming apparatus 20. Information about the setting items 200 for the PDF engine is not necessarily requested in step S110 and may be requested before the user issues a printing instruction. Then, the CPU 101 of the image forming apparatus 20 transmits information about the setting items 200 for the PDF engine.

In step S112, the user changes a setting item 200 using the input unit 105 of the image forming apparatus 30.

In step S114, the user issues a printing instruction using the input unit 105 of the image forming apparatus 30. For example, the user selects a job to be executed from among the print jobs displayed in the list and then operates a printing execution switch.

In step S116, the CPU 101 of the image forming apparatus 30 executes the print job, that is, causes the image forming unit 108 to output a printed material such as paper, in accordance with the setting item 200 changed in step S112.

Next, an example of the procedure of a process for the case where printing of a print job is performed using the image forming apparatuses 20 and 30 be described with reference to FIGS. 5 and 6. In this example, the case where a user moves to the location where the image forming apparatus 30 is installed and issues a printing instruction at the image forming apparatus 30 will be described. However, the present disclosure is not limited to this. The user may move to the location where the image forming apparatus 20 set as the parent apparatus is installed to issue a printing instruction to the image forming apparatus 20.

Figure 5:
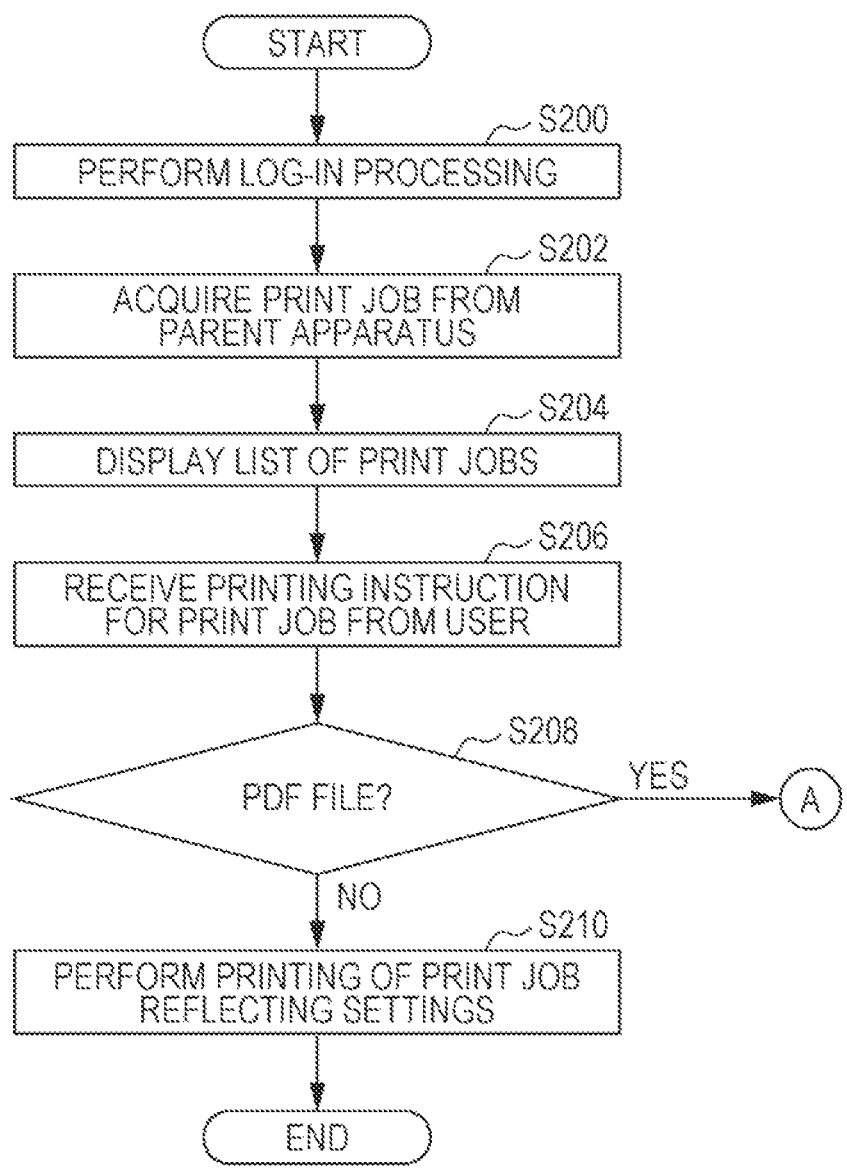
FIG. 5 is a flowchart illustrating an example of an operation of an image forming apparatus according to an exemplary embodiment of the present disclosure.
Figure 6:
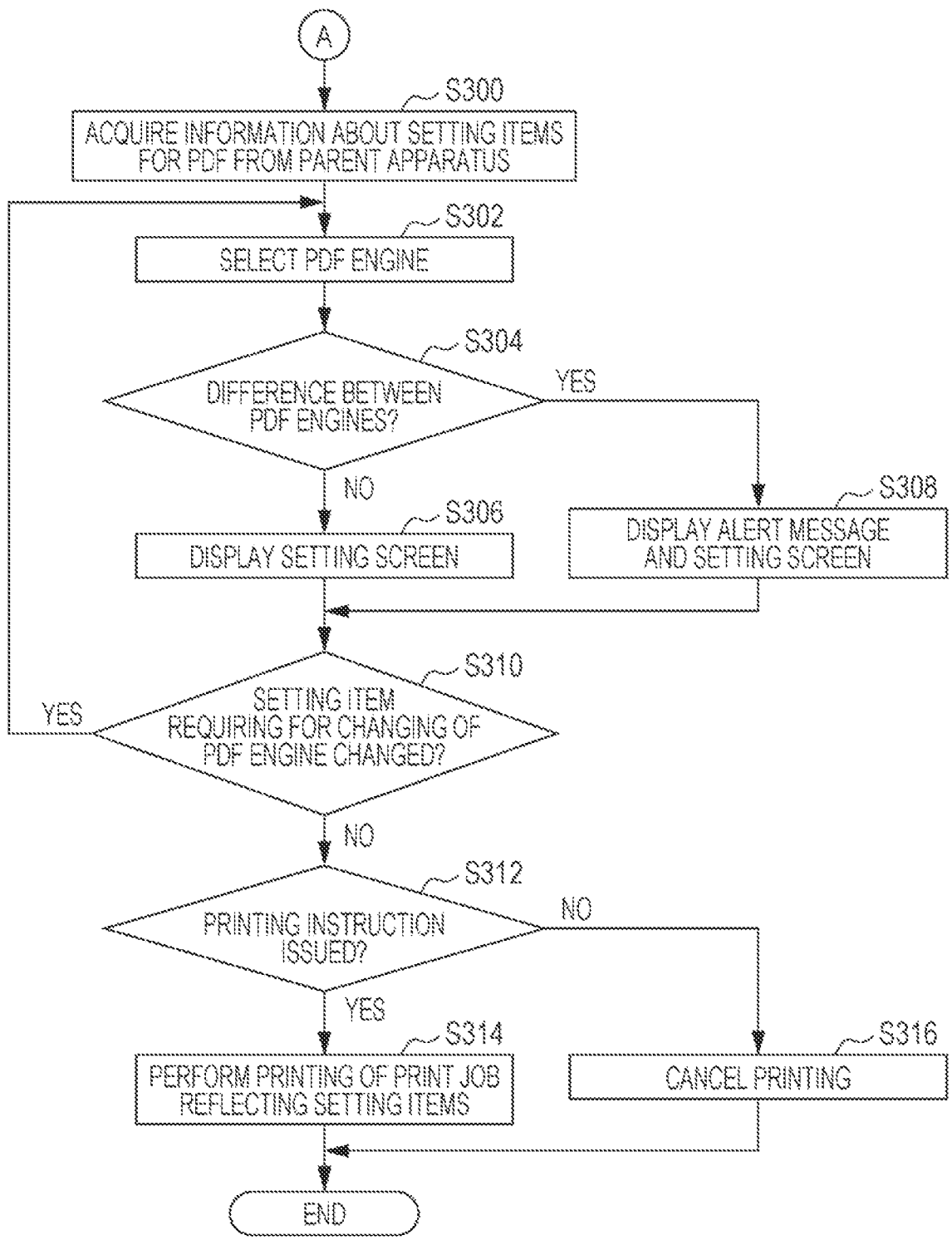
FIG. 6 is a flowchart illustrating the continued example of the operation of the image forming apparatus illustrated in FIG. 5.

In step S200 illustrated in FIG. 5, when the user causes the IC card reader 110 of the image forming apparatus 30 serving as a child apparatus to read an IC card, the CPU 101 of the image forming apparatus 30 performs log-in processing for the user. Then, the process proceeds to step S202.

In step S202, the CPU 101 of the image forming apparatus 30 acquires a print job for authentication information corresponding to authentication information registered in the read IC card from the image forming apparatus 20 serving as a parent apparatus that stores the print job. In the case where the image forming apparatus caused by the user to read the IC card is the image forming apparatus 20 set as a parent apparatus, this processing is not performed. Then, the process proceeds to step S204.

In step S204, the CPU 101 of the image forming apparatus 30 displays the list of print jobs on the display unit 106. Then, the process proceeds to step S206.

In step S206, the CPU 101 of the image forming apparatus 30 receives selection of a print job desired by the user and receives an instruction for printing of the selected print job. Specifically, the CPU 101 of the image forming apparatus 30 receives, from the user using the input unit 105, selection of a desired print job from the list of print jobs displayed on the display unit 106 and an operation on a switch for executing printing. Then, the process proceeds to step S208.

In step S208, the CPU 101 of the image forming apparatus 30 determines whether or not the print job for which the printing instruction has been issued is a PDF file. In the case where it is determined that the print job is not a PDF file, the process proceeds to step S210.

In step S210, the CPU 101 of the image forming apparatus 30 performs printing of the print job, that is, forms an image on paper. Then, the process ends.

In contrast, in the case where it is determined in step S208 that the print job is a PDF file, the process proceeds to step S300.

In step S300, the CPU 101 of the image forming apparatus 30 acquires information about the setting items 200 for the PDF engine from the image forming apparatus 20 serving as the parent apparatus. Then, the process proceeds to step S302.

In step S302, the CPU 101 of the image forming apparatus 30 selects a PDF engine on the basis of printing settings for the print job acquired in step S202 from among PDF engines provided in the image forming apparatus 30. Here, on the basis of contents of the print job, a PDF engine that is determined to be the most appropriate PDF engine is selected. For example in the case where the print job contains color data, a PDF engine that includes the setting item 200 that enables color printing is selected. Selection of the PDF engine is not necessarily based on the print job. For example, in the case where the image forming apparatus 30 includes the same PDF engine as that provided the parent apparatus, the PDF engine may be selected. Alternatively, a predetermined PDF engine may be selected. Then, the process proceeds to step S304.

In step S304, the CPU 101 of the image forming apparatus 30 determines whether there is a difference between the PDF engine provided in the parent apparatus acquired in step S300 and the PDF engine selected in step S302. The determination as to whether or not there is a difference between the PDF engines s performed on the basis of names of the PDF engines, types of setting items, and the like. In the case where it is determined the there is no difference between the PDF engines, the process proceeds to step S306.

Figure 7:
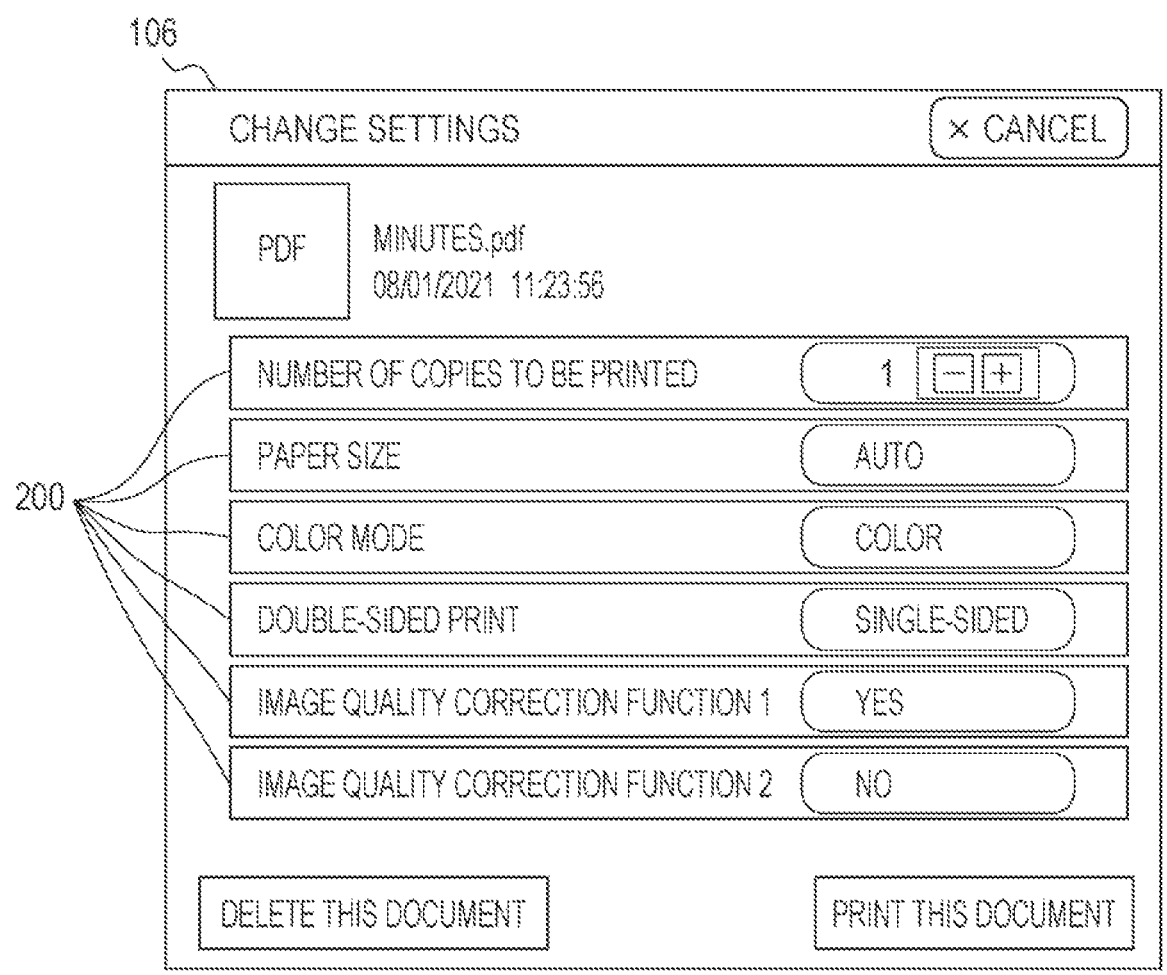
FIG. 7 is an explanatory diagram illustrating an example of display of a display unit of an image forming apparatus for change of settings in an exemplary embodiment of the present disclosure.

In step S306, the CPU 101 of the image forming apparatus 30 displays a setting screen (list of the setting items 200) illustrated in FIG. 7 on the display unit 106. The example of the display illustrated in FIG. 7 will be described later. With the display of the setting screen, the user is able to change the setting items 200. Then, the process proceeds to step S310.

In contrast, in the case where it is determined in step S304 that there is a difference between the PDF engines, the process proceeds to step 3308. In step S308, the CPU 101 of the image forming apparatus 30 displays an alert message M and a setting screen (list of the setting items 200) illustrated in FIG. 8 on the display unit 106. With the use of the display of the alert message M and the setting screen, the user is able to determine whether to continue printing or to change the setting items 200 and perform printing. The example of the display illustrated in FIG. 8 will be described later. Then, the process proceeds to step S310.

In step S310, the CPU 101 of the image forming apparatus 30 determines whether or not the user has changed a setting item 200 that requires change of a PDF engine. The determination as to whether or not a setting item 200 that requires change of a PDF engine has been changed is performed by determining whether or not a change has been made to a setting item 200 other than the setting items 200 that are able to be set by the PDF engine selected in step S302. In the case where it is determined that a setting item 200 that requires change of a PDF engine has been changed, the process returns to step S302. In contrast, in the case where it is determined that a setting item 200 that requires change of a PDF engine has not been changed, the process proceeds to step S312.

In step S312, a printing instruction wait state is entered, and it is determined whether or not a printing instruction has been issued from the user. In the case where it is determined that a printing instruction has been issued from the user, the process proceeds to step S314.

In step S314, the CPU 101 of the image forming apparatus 30 performs printing of the print job reflecting the setting items 200. Then, the process ends.

In contrast, in the case where it is determined in step S312 that a printing instruction has not been issued, the process proceeds to step S316. In step S316, on condition that, for example, a printing instruction has not been issued for a predetermined time, printing is canceled. Then, the process ends.

Next, the setting items 200 displayed on the display unit 106 will be described with reference to FIGS. 7 and 8.

FIG. 7 illustrates an example of display of the setting items 200 for the case where the PDF engine A, which is the same as the PDF engine A provided in the parent apparatus, is selected by the CPU 101 of the image forming apparatus 30. As illustrated in FIG. 7, the setting items 200 are displayed on the display unit 106 such that the setting items 200 are arranged vertically. The user is able to perform setting of the setting items 200 using the input unit 105. For example, as illustrated in FIG. 7, in the case where a default setting "color" is set for the setting item 200 "color mode", the user is able to change "color" to "monochrome" by touching with his or her finger a part in which the characters "color" are displayed. Default settings of the setting items 200 are not limited to those illustrated in FIG. 7.

In the example of FIG. 7, all the setting items 200 for the PDF engine A and the PDF engine B that are provided in the image forming apparatus 30 serving as the child apparatus are displayed. That is, in the case where a setting item 200 is changed by the user, the selected PDF engine (in this example, the PDF engine A) is changed to a different PDF engine (in this example, the PDF engine B), and setting items 200 with which printing is able to be performed are also displayed.

All the setting items 200 for the PDF engine A and the PDF engine B that are provided in the image forming apparatus 30 serving as the child apparatus are not necessarily displayed. Only setting items 200 with which printing is able to be performed using a selected PDF engine may be displayed in the case where only setting items 200 with which printing is able to be performed using a selected PDF engine are displayed, even if the user changes the setting items 200, the PDF engine is not changed.

Figure 8:
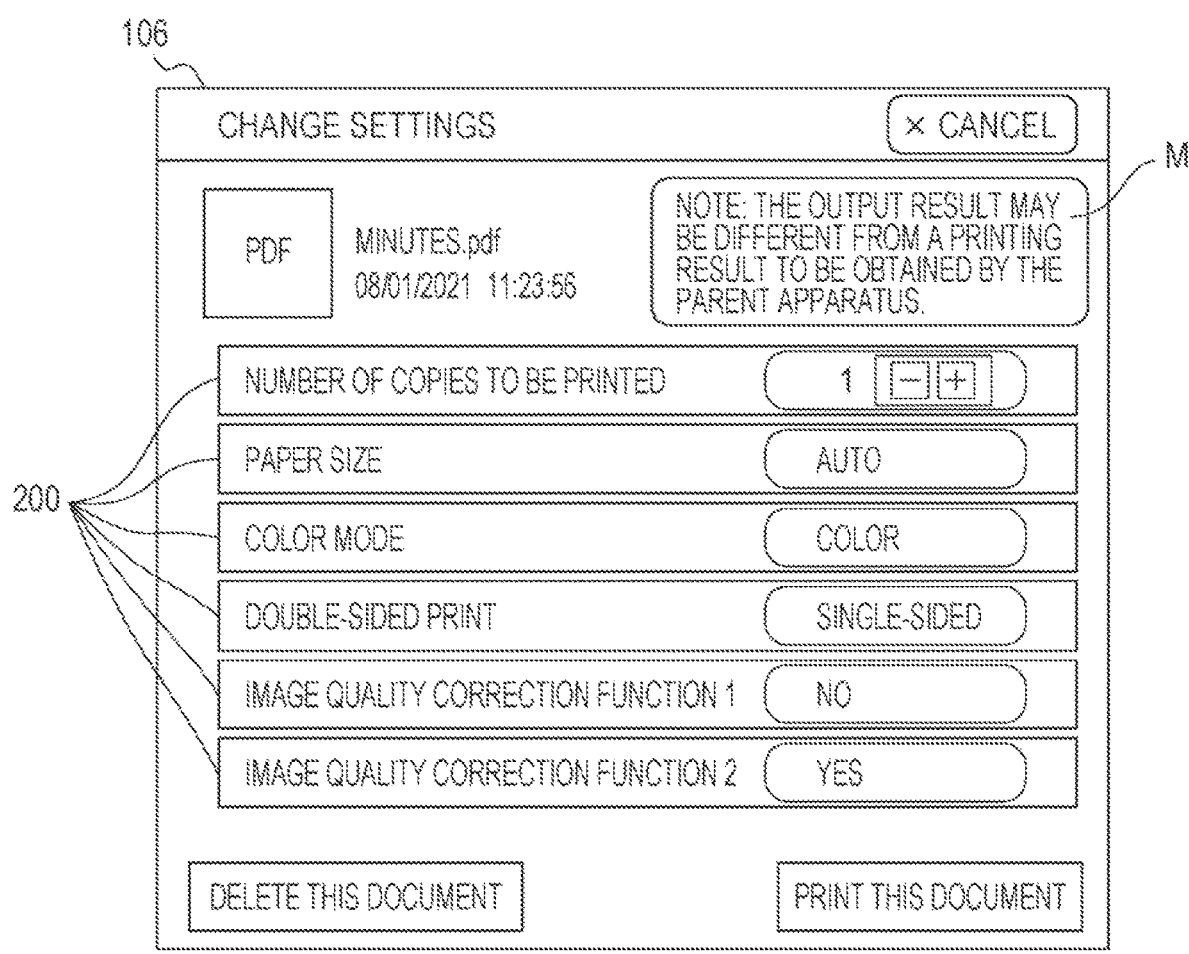
FIG. 8 is an explanatory diagram illustrating another example of display of the display unit of the image forming apparatus for change of settings in the exemplary embodiment of the present disclosure.

Furthermore, as illustrated in FIG. 8, the user is able to change the state illustrated in FIG. 7 into the state illustrated in FIG. 8 in such a manner that a default setting "YES" for the setting item 200 "image quality correction function 1" is changed to "NO" and a default setting "NO" for the setting item 200 "image quality correction function 2" to "YES". Thus, the image quality correction function 2 becomes enabled. In this case, as illustrated in FIG. 3, the PDF engine A does not have the setting item 200 "image quality correction function 2". Therefore, the CPU 101 of the image forming apparatus 30 changes the PDF engine from the PDF engine A to the PDF engine B. In accordance with this, the PDF engine B, which is different from the PDF engine A provided in the parent apparatus, is selected. Accordingly, the alert message M such as "Note: The output result may be different from a printing result to be obtained by the parent apparatus." is displayed on the display unit 106, and the user is notified of the alert message M. For example, the alert message M indicates that a different printing result may be obtained due a difference between PDF engines because printing is performed using the PDF engine (in this example, the PDF engine B) different from the PDF engine (in this example, the PDF engine A) that is used at the parent apparatus. The user views the notification and is thus able to select between continuing printing and changing the setting for the image quality correction function 2 from "YES" to "NO" so that the same PDF engine (in this example the PDF engine A) as that provided in the parent apparatus is able to be used by canceling use of the image quality correction function 2.

Furthermore, a message such as "If you change this setting item, a PDF engine will be changed." may be displayed on the display unit 106 so that the user is able to be notified that the PDF engine will be changed by the change of the setting item 200 when the user performs the operation for changing the setting item 200. Furthermore, display of a setting item 200 that will cause a change of the PDF engine when the setting item 200 is changed may be made different from display of the other setting items 200. In this case, before the user performs an operation for changing the setting item 200, the user may be notified that changing the setting item 200 will cause a change of the PDF engine.

Different printing results may be produced by PDF engines with the same setting value of the setting item 200. That is, in the case where a PDF engine selected by the CPU 101 of the image forming apparatus 30 is different from a PDF engine serving as a parent apparatus, different printing results may be obtained even with the same setting item 200. For example, even in the case where "color" is set for "color mode", the hue printed on paper may be different between the case where printing is performed using the PDF engine A and the case where printing is performed using the PDF engine B. Thus, even in the case where the setting item 200 for the PDF engine selected by the CPU 101 of the image forming apparatus 30 is the same as the setting item for the PDF engine serving as a parent apparatus, the alert message such as "Note: The output result may be different from a printing result to be obtained by the parent apparatus." indicating that a different printing result may be obtained may be displayed and notified to the user.

Modifications

The present disclosure is not limited to the exemplary embodiments described above. Various modifications and applications may be included in the present disclosure without departing from the scope of the present disclosure.

In the foregoing exemplary embodiments, a mode in which a program is stored (installed) in advance in the ROM 102 or the storage 104 has been described. However, the present disclosure is not limited to this. A program may be recorded in a recording medium such as a compact disk read-only memory (CD-ROM), a digital versatile disk-read only memory (DVD-ROM), or a universal serial bus (USB) and provided. Furthermore, a program may be downloaded from an external apparatus via the network N.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A first image forming apparatus of a plurality of image forming apparatuses, the first image forming apparatus comprising:
    a plurality of rendering engines including a first rendering engine; and
    a processor configured to:
        acquire information about a second rendering engine from a second image forming apparatus of the plurality of image forming apparatuses,
            the second image forming apparatus comprising the second rendering engine,
            the plurality of image forming apparatuses being connected to a network and being configured to perform printing using corresponding rendering engines, and
            each rendering engine including a predetermined plurality of setting items,
            wherein the predetermined plurality of setting items of the rendering engine are the setting items that can be set by the rendering engine;
        display a setting item that is able to be changed, out of a setting item for the second rendering engine acquired from the second image forming apparatus and a setting item for the first rendering engine provided in the first image forming apparatus;
        receive a change of the displayed setting item;
        select a rendering engine based on a printing setting for an acquired print job, the rendering engine being selected from among the plurality of rendering engines provided in the first image forming apparatus, and the selected rendering engine being the first rendering engine;
        compare the second rendering engine acquired from the second image forming apparatus with the first rendering engine selected according to the printing setting for the print job; and
        when, according to a result of the comparison, the selected first rendering engine is different from the second rendering engine acquired from the second image forming apparatus, provide a notification that a different printing result may be obtained if printing continues to be performed.

2. The first image forming apparatus according to claim 1, wherein the processor is configured to, after the notification is received, in a case where execution of printing by a user is not received, cancel printing.

3. The first image forming apparatus according to claim 2, wherein the setting item that is able to be changed is a setting item with which printing is able to be performed using the selected rendering engine in a case where the setting item is changed.

4. The first image forming apparatus according to claim 3, wherein even in a case where a setting of the setting item for the rendering engine provided in the second image forming apparatus and a setting of the setting item for the rendering engine provided in the first image forming apparatus are the same, different printing results may be obtained.

5. The first image forming apparatus according to claim 2, wherein the setting item that is able to be changed is a setting item with which printing is able to be performed using a rendering engine different from the selected rendering engine in a case where the setting item is changed.

6. The first image forming apparatus according to claim 5, wherein the processor is configured to, after the change of the setting item is received, in a case where the rendering engine is changed from the selected rendering engine, perform printing using the changed rendering engine.

7. The first image forming apparatus according to claim 2, wherein even in a case where a setting of the setting item for the rendering engine provided in the second image forming apparatus and a setting of the setting item for the rendering engine provided in the first image forming apparatus are the same, different printing results may be obtained.

8. The first image forming apparatus according to claim 1, wherein the setting item that is able to be changed is a setting item with which printing is able to be performed using the selected rendering engine in a case where the setting item is changed.

9. The first image forming apparatus according to claim 8, wherein even in a case where a setting of the setting item for the rendering engine provided in the second image forming apparatus and a setting of the setting item for the rendering engine provided in the first image forming apparatus are the same, different printing results may be obtained.

10. The first image forming apparatus according to claim 1, wherein the setting item that is able to be changed is a setting item with which printing is able to be performed using a rendering engine different from the selected rendering engine in a case where the setting item is changed.

11. The first image forming apparatus according to claim 10, wherein the processor is configured to, after the change of the setting item is received, in a case where the rendering engine is changed from the selected rendering engine, perform printing using the changed rendering engine.

12. The first image forming apparatus according to claim 1, wherein even in a case where a setting of the setting item for the rendering engine provided in the second image forming apparatus and a setting of the setting item for the rendering engine provided in the first image forming apparatus are the same, different printing results may be obtained.

13. The first image forming apparatus according to claim 1, wherein the rendering engine deals with a portable document format.

14. The first image forming apparatus according to claim 13, wherein printing by the first image forming apparatus is performed based on portable document format direct print.

15. An image forming method for a first image forming apparatus of a plurality of image forming apparatuses, the first image forming apparatus including a plurality of rendering engines including a first rendering engine, and the method comprising:
   acquiring information about a second rendering engine from a second image forming apparatus the plurality of image forming apparatuses,
   the second image forming apparatus comprising the second rendering engine,
   the plurality of image forming apparatuses being connected to a network and being configured to perform printing using corresponding rendering engines, and
   each rendering engine including a predetermined plurality of setting items,
   wherein the predetermined plurality of setting items of the rendering engine are the setting items that can be set by the rendering engine;
   displaying a setting item that is able to be changed, out of a setting item for the second rendering engine acquired from the second image forming apparatus and a setting item for the first rendering engine provided in the first image forming apparatus;
   receiving a change of the displayed setting item;
   selecting a rendering engine based on a printing setting for an acquired print job, the rendering engine being selected from among the plurality of rendering engines provided in the first image forming apparatus, and the selected rendering engine being the first rendering engine;
   comparing the second rendering engine acquired from the second image forming apparatus with the first rendering engine selected according to the printing setting for the print job; and
   when, according to a result of the comparison, the selected first rendering engine is different from the second rendering engine acquired from the second image forming apparatus, providing a notification that a different printing result may be obtained if printing continues to be performed.

16. A non-transitory computer readable medium storing a program causing a computer to execute a process for a first image forming apparatus of a plurality of image forming apparatuses, the first image forming apparatus including a plurality of rendering engines including a first rendering engine, and the process comprising:
   acquiring information about a rendering engine from a second image forming apparatus of the plurality of image forming apparatuses,
   the second image forming apparatus comprising the second rendering engine,
   the plurality of image forming apparatuses being connected to a network and being configured to perform printing using corresponding rendering engines,
   each rendering engine including a predetermined plurality of setting items,
   wherein the predetermined plurality of setting items of the rendering engine are the setting items that can be set by the rendering engine;
   displaying a setting item that is able to be changed, out of a setting item for the rendering engine acquired from the second image forming apparatus and a setting item for a rendering engine provided in the first image forming apparatus; and
   receiving a change of the displayed setting item;
   selecting a rendering engine based on a printing setting for an acquired print job, the rendering engine being selected from among the plurality of rendering engines provided in the first image forming apparatus, and the selected rendering engine being the first rendering engine;
   comparing the second rendering engine acquired from the second image forming apparatus with the first rendering engine selected according to the printing setting for the print job; and
   when, according to a result of the comparison, the selected first rendering engine is different from the second rendering engine acquired from the second image forming apparatus, providing a notification that a different printing result may be obtained if printing continues to be performed.

* * * * *